US009010625B2

(12) United States Patent
Gutierrez (10) Patent No.: US 9,010,625 B2
(45) Date of Patent: Apr. 21, 2015

(54) METHOD AND APPARATUS FOR AUTHENTICATING, TRACKING, AND MARKETING PRODUCTS

(71) Applicant: Robert Gutierrez, Coral Gables, FL (US)

(72) Inventor: Robert Gutierrez, Coral Gables, FL (US)

(*) Notice: Subject to any disclaimer, the term of this patent is extended or adjusted under 35 U.S.C. 154(b) by 0 days.

(21) Appl. No.: 14/197,561

(22) Filed: Mar. 5, 2014

(65) Prior Publication Data

US 2014/0252081 A1 Sep. 11, 2014

Related U.S. Application Data

(60) Provisional application No. 61/932,838, filed on Jan. 29, 2014, provisional application No. 61/772,770, filed on Mar. 5, 2013.

(51) Int. Cl.
*G06F 17/00* (2006.01)
*G06Q 30/06* (2012.01)

(52) U.S. Cl.
CPC .................... *G06Q 30/0623* (2013.01)

(58) Field of Classification Search
USPC ............................ 235/375, 376, 383, 384, 385
See application file for complete search history.

(56) References Cited

U.S. PATENT DOCUMENTS

| 7,108,183 | B1 | 9/2006 | Cox, Jr. | |
| 8,584,942 | B1* | 11/2013 | Rayes et al. | 235/385 |
| 2002/0079372 | A1 | 6/2002 | Hino | |
| 2010/0022221 | A1* | 1/2010 | Yi et al. | 455/414.1 |
| 2011/0194574 | A1 | 8/2011 | Zhang et al. | |
| 2012/0173393 | A1* | 7/2012 | Acuff et al. | 705/28 |
| 2012/0212564 | A1 | 8/2012 | Yamamoto et al. | |
| 2012/0267428 | A1 | 10/2012 | Oyster et al. | |
| 2012/0278242 | A1* | 11/2012 | Griffith | 705/304 |
| 2013/0191250 | A1* | 7/2013 | Bradley et al. | 705/26.61 |

FOREIGN PATENT DOCUMENTS

| EP | 1160215 A1 | 12/2001 |
| EP | 1174349 A1 | 1/2002 |

OTHER PUBLICATIONS

Chaudhury et al, Bonding of Vapor Deposited Gold to Glass Using Organosilane Primers, j. aDHESION sCI. tECH., vol. 1, No. 3, pp. 243-246, 1987.

* cited by examiner

*Primary Examiner* — Seung Lee
(74) *Attorney, Agent, or Firm* — Gifford, Krass, Sprinkle, Anderson & Citkowski, P.C.

(57) ABSTRACT

A method and system for marketing products with digital codes that may be scanned by a cell phone to establish communications with a website including information about the product. The digital codes identify the unique product as well as the general class of similar products and this allows the website to establish and record information that tracks the movement of the product over time for product authentication, mobile marketing, and the like, for use by authorized personnel.

9 Claims, 6 Drawing Sheets

METHOD AND APPARATUS FOR AUTHENTICATING, TRACKING, AND MARKETING PRODUCTS

CROSS-REFERENCE TO RELATED APPLICATIONS

This application priority of U.S. Provisional Application 61/772,770 filed Mar. 5, 2013, and U.S. Provisional Application 61/932,838 filed Jan. 29, 2014, the contents of which are incorporated herein by reference.

FIELD OF THE INVENTION

This invention relates to a method and apparatus for marking products being marketed with a unique identifier which allows possessors of the product to communicate with a website containing pertinent information relative to the product and, in certain cases, to modify that information in an interactive manner.

BACKGROUND OF THE INVENTION

Products have long been marked with digital codes that may be read by a scanner to determine characteristics of the product. For example, barcodes encoded with the SKU of a product are used in connection with point of sale scanners to electronically calculate the prices of goods being purchased. More recently, three-dimensional digital codes such as QR codes, RFID, or the like have been marked on products to encode both details about the nature of the product as well as the address, or URL, of a website located on the Internet which may contain additional information relating to the product. Mobile electronic devices, such as cell phones in particular, may be provided with applications (apps) which allow the devices to scan appropriate digital barcodes and use that information to contact the website containing the information relating to the product.

The information encoded in a website which is contacted by scanning such a barcode is generally generic to the particular product, with all products of that class bearing the same digital code. For example, if a food product contains a QR code that may be scanned to put the user in contact with a website including nutritional information relating to that food product, all possessors of containers of the food product will receive the same message when their products are scanned to contact that website.

SUMMARY OF THE INVENTION

The present invention is directed toward a system for marking products with digital codes that may be scanned to bring the user into communication with a website which not only contains generic information relating to the type of products marked with the barcode but also individual information which may only relate to a single particular product in the broad class or a subclass of products in the class.

For example, assume a winemaker produces a 2013 vintage of a chardonnay which is trademarked "Eagle". All of the labels for the Eagle bottles will contain a digital code which may be scanned to put a possessor of the bottle in communication with the winemaker's website, and in particular with a section of the web site dealing with the 2013 Eagle product. However, the digital code for each bottle will also contain an individual identifying code for that bottle. The website will use that information to record, and make available to a limited extent, information that deals solely with that bottle or a particular subclass of the Eagle 2013 bottles including the scanned bottle.

The generic information provided when any of the Eagle 2013 bottles are scanned may include the sources of the grapes, the climactic conditions under which the grapes were grown, the dates on which the grapes were harvested, and similar information generic to all of the 2013 Eagle bottles. However, using the individual code identifying that unique bottle, as transmitted by the scanner, the website may include information related to the particular bottle scanned or a subset of the bottles including the particular one which is scanned.

Thus, unlike prior art systems, in the practice of the present invention each bottle has a unique identification in the digital tag and when a tag is scanned so that the cell phone or the like is placed in contact with the associated website, the unique identification for the container is transmitted to the website. The website includes a memory that stores identifying information for each bottle, such as when it was shipped, to whom it was shipped, the name of the retailer who received the bottle, when it was sold to the user, and the like. The website may also receive and store user comments regarding the product.

When a particular product is scanned, the transmission to the website may include the geographic location of the container, assuming the scanning device is equipped with a Global Positioning System (GPS). The website will store the location associated with each scan and the time of the scan to produce a record of the movement of the container over time which can be accessed by authorized personnel for tracking and marketing purposes. This system may be used for the authentication, tracking and marketing of the products. The information relating to the handling of the product, including the wholesaler, retailer and customer, may be analyzed to enhance marketing of these products in general. For example, the particular user may receive customized emails regarding products the marketer feels they would be inclined to purchase considering their responses to the website.

In another aspect of the present invention the proprietor of a product so marked may send messages to the website essentially personalizing his or her claim to the article. Once claimed, the article may not be claimed by an additional party and the "owner" of the claimed article can exercise a degree of control over the manner in which third parties may interact with the information contained on the website regarding that product.

In another aspect of the invention groups or subgroups of the product may each employ the same unique identification. For example, a shipment from the bottler to one distributor may bear a different designation than a shipment to a different distributor for market analysis purposes.

These marking techniques and the nature of the website system allow the authentication and brand protection of the product; individual tracking and reporting over the sales of a particular product; mobile marketing and ecommerce; and consumer and professional data storage. Authentication of a bottle or other container or product, that is assurance that it is not a counterfeit, is achieved by successfully contacting the producer's website when the digital code on the product is scanned. It is relatively easy to counterfeit a label but much more difficult to counterfeit a digital code.

The codes contained on the products may also be used in shipping. When the products are shipped in closed cartons or the like, windows may be provided in the cartons to allow access to the digital codes for determination of the contents of the carton.

BRIEF DESCRIPTION OF THE DRAWINGS

Other objectives, advantages, and applications of the present invention will be made apparent by the following detailed description of preferred embodiments of the invention. The description makes reference to the accompanying drawings in which.

DETAILED DESCRIPTION OF PREFERRED EMBODIMENTS OF THE INVENTION

The following description relates to a wine bottle which is merely exemplary of the type of product which may be used in connection with the present invention. The present invention is adaptable to all classes of consumer products and many commercial and industrial products, and the wine bottle is only described for exemplary purposes.

Figure 1:
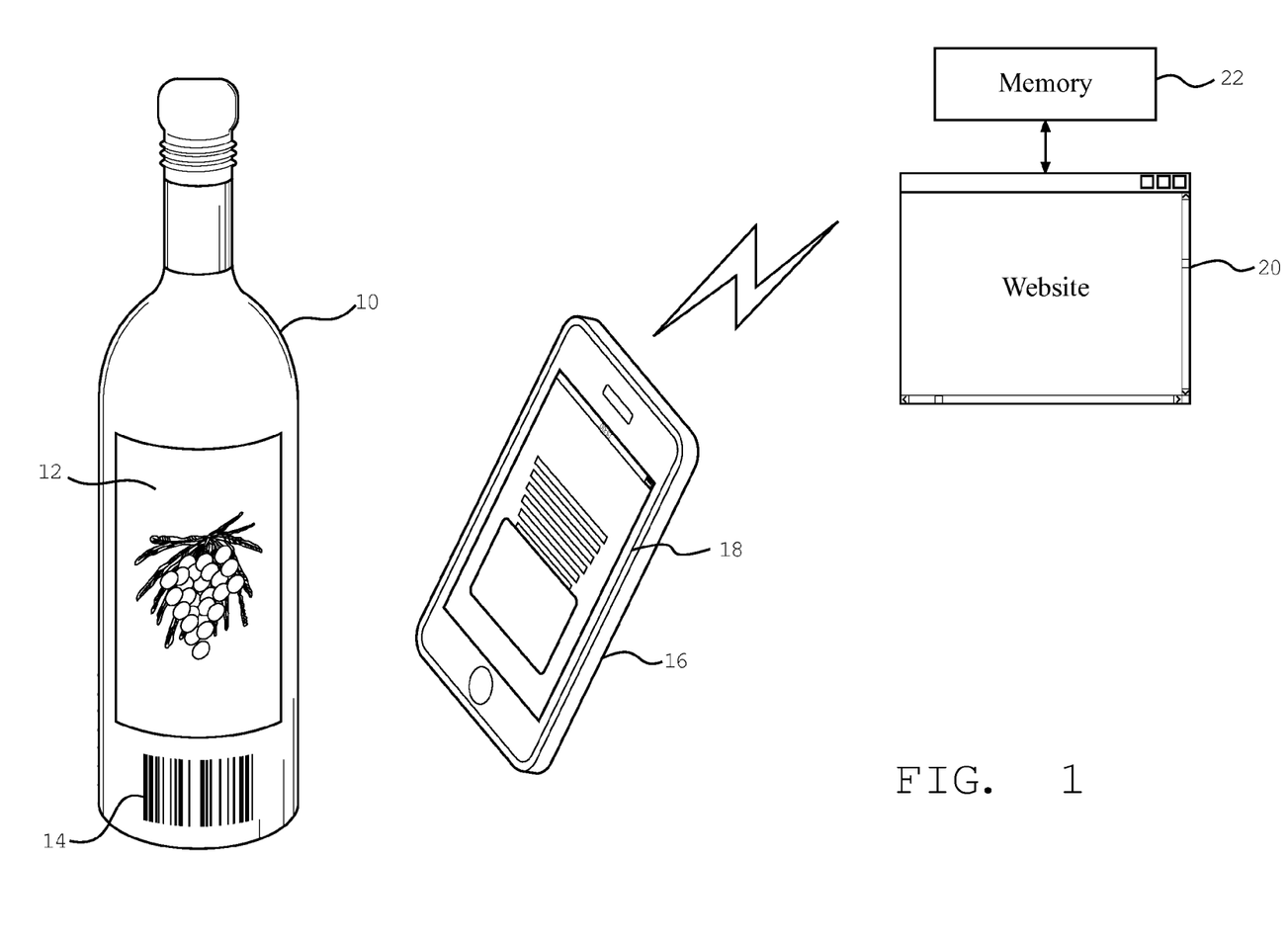
FIG. 1 is a schematic diagram illustrating a wine bottle marked with a unique digital code in accordance with the present invention and being scanned by a cell phone which then communicates interactively with a website storing information relative to the bottle and its contents.

FIG. 1 illustrates a wine bottle 10 marked with a conventional label 12 and a digital code 14 of a unique variety formed in accordance with the present invention. The digital code 14 may take the form of a barcode, QR code, RFID chip, near field device, and the like, which are encoded with information relating to the product, often including the address of a website containing detailed information relating to the marked item. These devices may be read by handheld scanners incorporated in mobile phones or the like. The digital codes enable the scanning device, which typically has an electronic screen, to be connected to a website, usually using the Internet. These electronic tags or labels provide a system for allowing the possessor of the product to access information relating to the product beyond that imprinted on the label 12 or similar packaging.

The digital tags 14 of the present invention not only encode generic information related to the container and its product but also an identification of the unique container or package, in this case the singular bottle. Thus, the producer of the bottle of wine 10 may produce thousands of substantially identical bottles but each one will be marked with a digital code that uniquely identifies it and distinguishes it from all others. In alternative embodiments of the invention some small subgroups of all the identical products may share the same unique encoded identification, assuming they move together in commerce.

The digital label 14 may be scanned by a conventional cell phone 16 or similar electronic device which typically has an electronic screen 18 for displaying information to the user. Some cell phones are equipped with the scanning ability and others may be provided with scanning ability through applications (apps) which may be transmitted to the device 16 electronically.

When the device 16 scans the digital code 14, information is provided to the electronic device that allows it to send a message, typically over the Internet, to a particular website 20, having a URL which is encoded in the device 16. The website 20 has an associated memory 22 which may store information transmitted to it by the device 16. The memory will also store the Internet display information which will be transmitted to the device 16 for viewing by the possessor of the bottle on the screen 18.

The broad aspect of the present invention is the fact that the unique product identification stored in the code 14 will provide information to the website regarding this particular product. That information is typically stored in the memory 22 and may be accessed through the website 20 by authorized personnel. Some of the information will not be in any way proprietary or confidential and may be available to anyone who scans the code 14 associated with the bottle 10 or simply accesses the website 20 through its URL which may be entered into the keyboard of the device 16.

Figure 2:
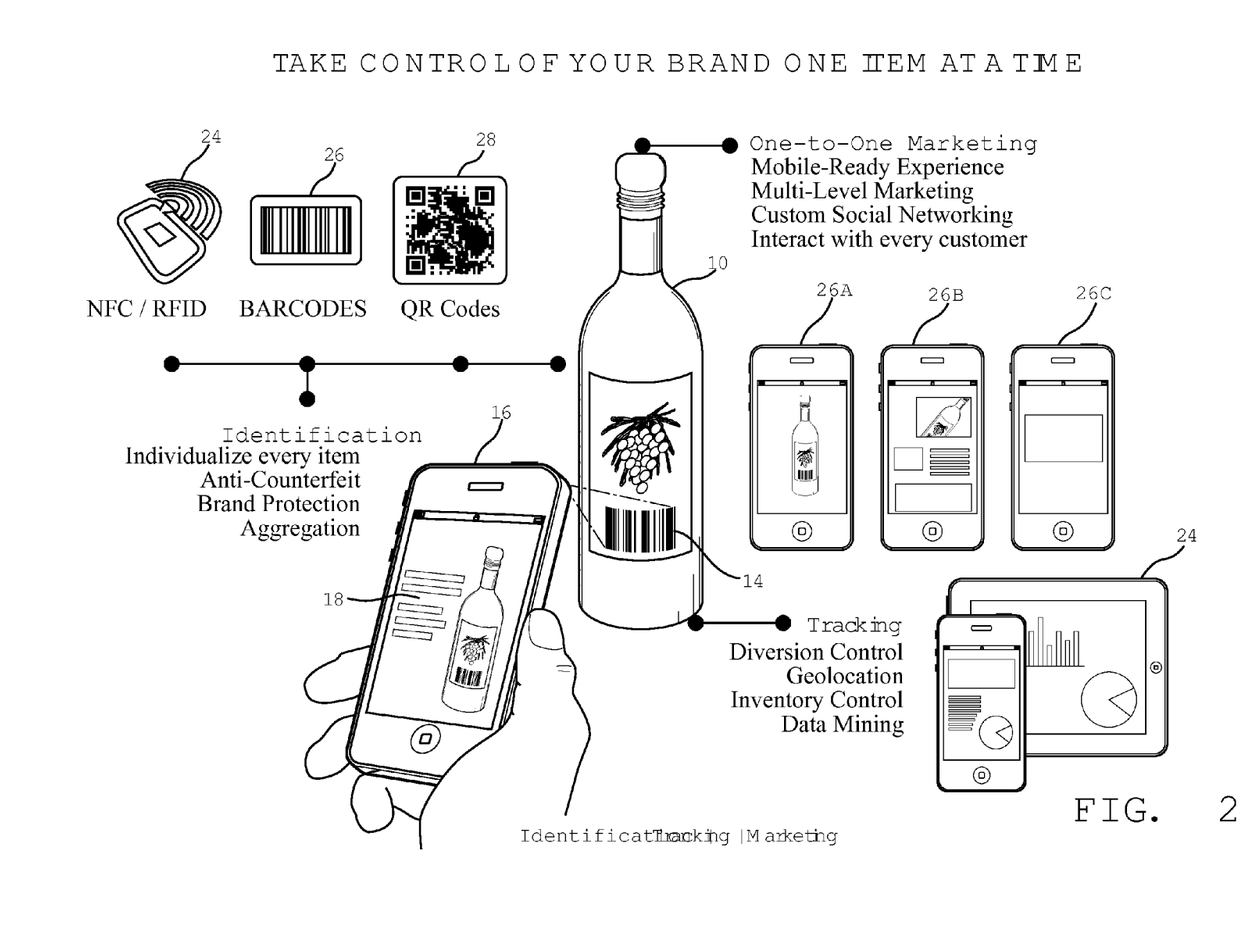
FIG. 2 is an illustration of the wine bottle and scanning cell phone of FIG. 1 with indications of the type of digital codes that may be used to mark the wine bottle in accordance with the present invention and typical information which may be transmitted from the website to the scanning cell phone.

FIG. 2 illustrates a cell phone 16 being used to scan the digital code 14 of the bottle of wine 10. FIG. 2 illustrates the variety of digital codes that may be employed in connection with this invention including near field communication/RFID codes 24, barcodes 26, or three-dimensional codes such as the QR codes 28.

Figure 3:
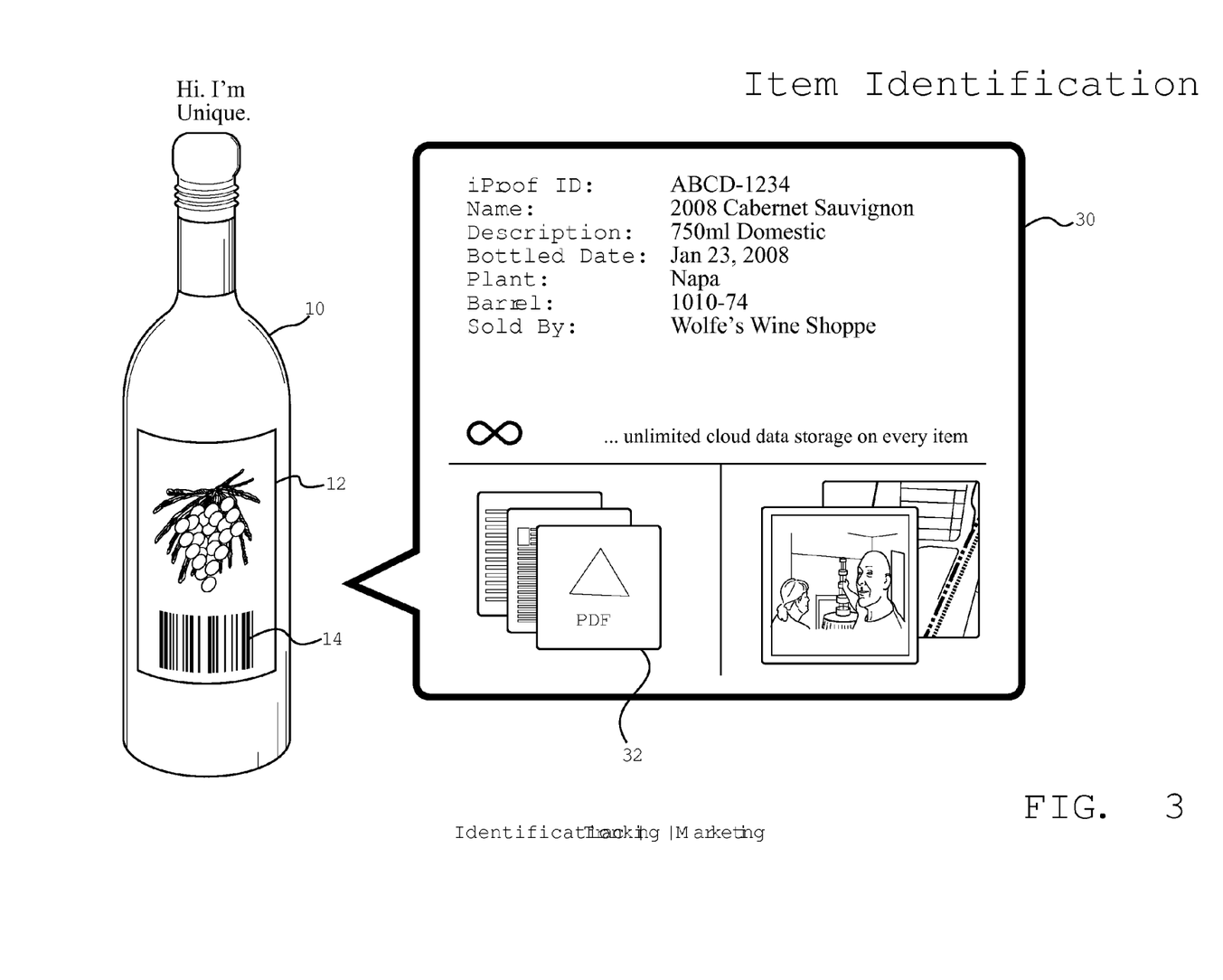
FIG. 3 illustrates a panel of basic information relating to the container marked with a digital code of the present invention which is provided by the contacted website and displayed on the screen of the scanning device.

The fact that the codes 14 provide information relating to the individual container 10, as opposed to all wine bottles with the same contents of the container 10, gives rise to many of the advantages of the present invention. Each time the barcode 14 is scanned by the cell phone or like electronic device 16 so as to send a message to the website 20 which includes the unique code of the bottle 10, the website acts to store the time of receipt of that information and the geographic location of the bottle 10, as determined by the GPS of the deice 16, to the website 20. The website 20 may then generate tracking information, which is stored in memory 22, which may be transmitted back to the device 16 in some form such as shown at 24. From that information the proprietor of the system may exercise diversion control, shifting inventory from one location to another where it is more likely to be sold, inventory control, and data mining. The website may then generate a variety of screens such as 24, which contains the basic information of interest to the possessor of the bottle as well as where it was sold and the particular code of the bottle. It may also include personalized messages 32 based on information derived by the website 20 from scanning of the digital code 14. For example, if the bottle was purchased from a particular store, specials that store may be offering may be featured on the screens transmitted back to the cell phone 16. Similarly, specials on the type of wine that was purchased may be offered to be possessor of the bottle. If the bottle is now located at a position inconvenient to the original point of purchase, other stores that offer similar bottles may be featured.

With the system of the present invention if the bottle is a counterfeit, i.e. not produced by the indicated proprietor, the user will be unable to contact the website 20 through scanning the code 14 and will recognize the product as a counterfeit. The unique system of the present invention thus enables identification of the products, tracking of the products, and any marketing of the products.

Figure 4:
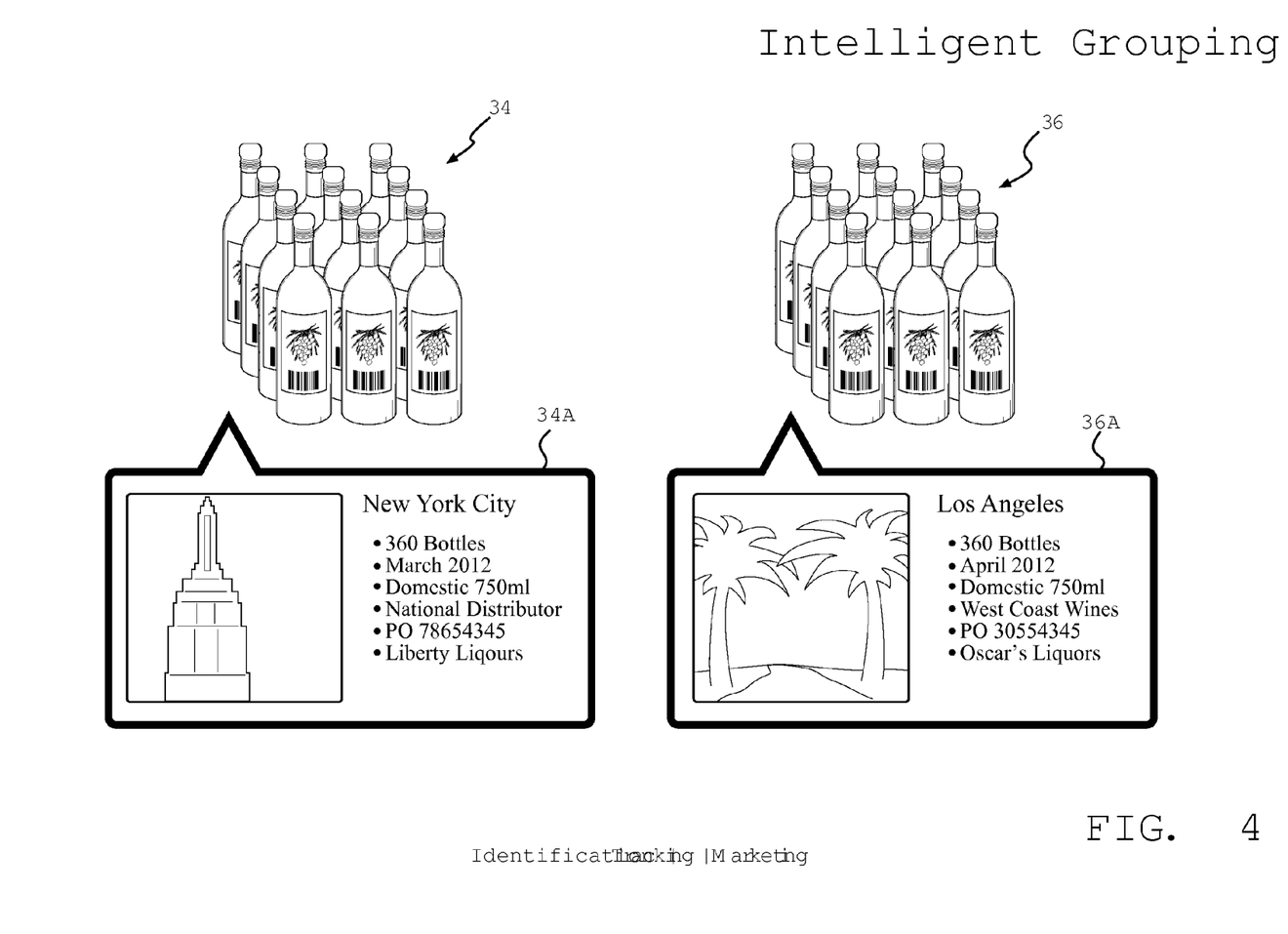
FIG. 4 illustrates the manner in which two groups of wine bottles containing identical wines may be identified in terms of where and when they have been shipped by the producer.

FIG. 4 illustrates two groups 34 and 36 of bottles that contain exactly the same product but were sold through different distributors. Again, analysis of where the bottles are located at the time of the scanning will provide valuable marketing information. The two groups will produce different displays 34a and 36a, respectively, on the screens 18 of the scanning electronic devices 16.

Figure 5:
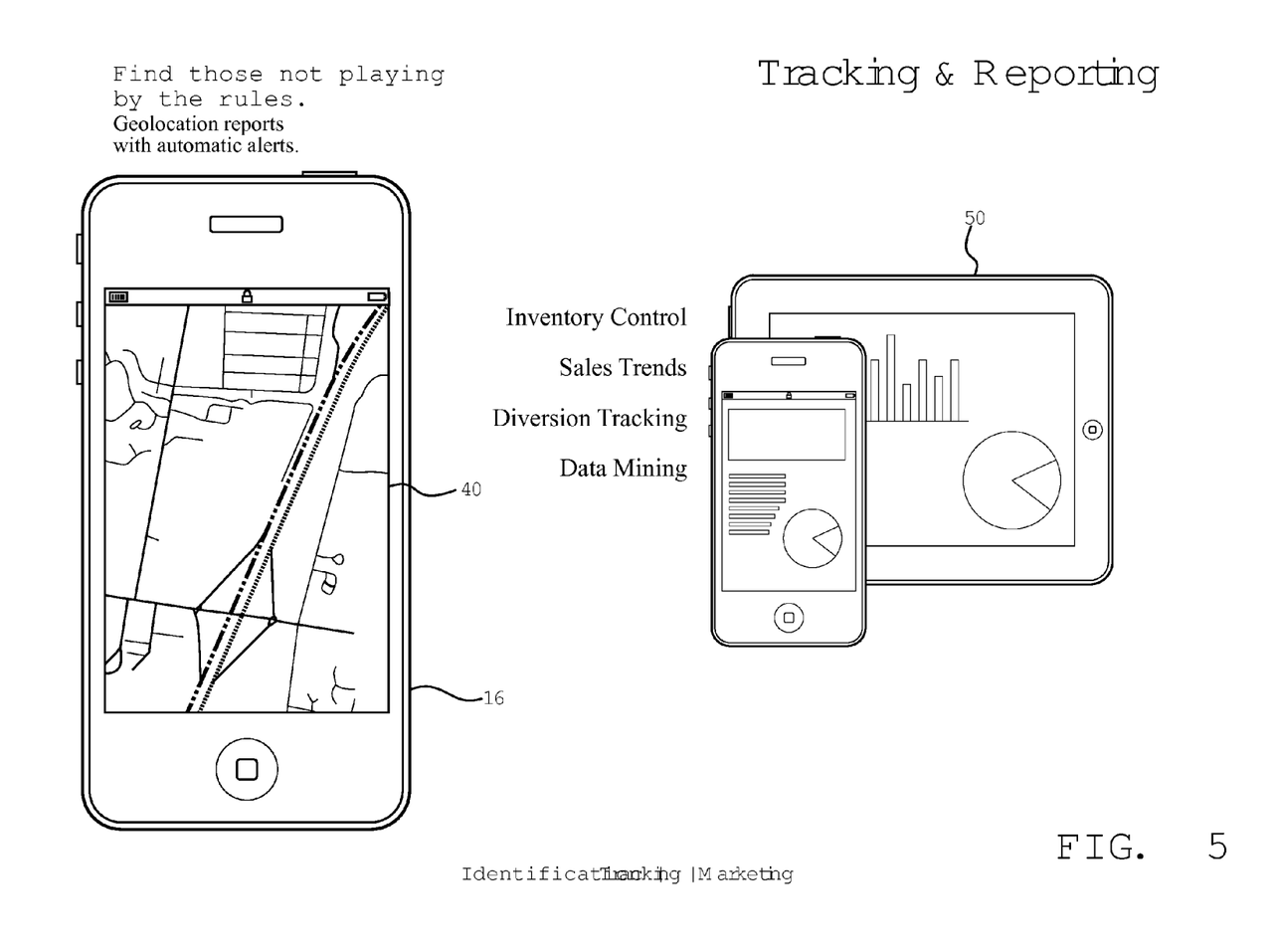
FIG. 5 illustrates the manner in which the system of the present invention may track the travels of the particular product or subgroup of products and may produce a report to authorized persons relating to the travels.

FIG. 5 illustrates certain of the reports that may be generated by the website 20 as a result of the receipt of the unique container numbers provided for each of the products utilizing the present invention.

The screen 40 illustrated on the cell phone 16 represents a map of a product location. To the extent that such location is not connected with an authorized distributor's location, it is a sign that diversion of the product has occurred and an automatic alert is generated by the website 20.

The screen 50 constitutes a marketing chart indicating inventory levels, sales trends, diverted shipments, and data mining. Again, all result from the use of the unique identifier for a particular product container.

The present invention allows the possessor of one of the uniquely marked products to establish an ownership claim to the article so marked on the website. Once claimed, the article may not be claimed by an additional party and the "owner" of the claimed article can exercise a degree of control over the manner in which third parties may interact with the website that information on the tag may direct a scanning device to connect with.

The type of control that may be exercised will be dependent upon the individual item but, for example, the owner may program the website so as to prevent or allow the addition of comments by third parties or only allow certain third parties to add such comments to the website. As an example, the website may be programmed to only allow a listed group of individuals associated with the owner of the claim to add comments or to otherwise alter the information provided to persons scanning the label. Alternatively, the owner of a claim to a device may make certain sections of the information confidential so that they may only be accessed by a list of individuals that the owner has encoded into the device. The control alternatives that the owner of a claim to the article may exercise may be listed in the information that the owner can acquire by scanning the item.

Figure 6:
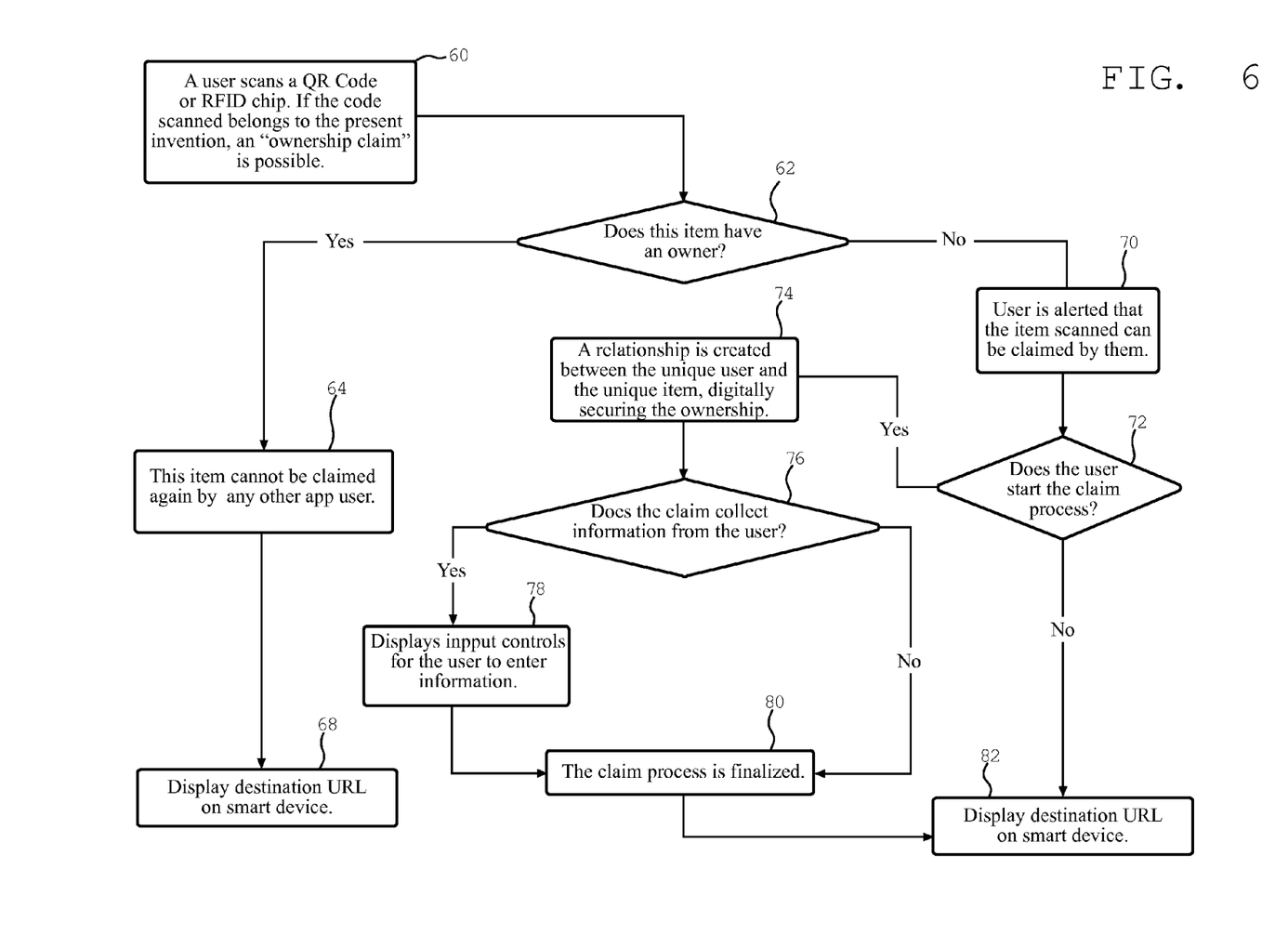
FIG. 6 is a flowchart illustrating the manner in which a possessor of a bottle marked in accordance with the present invention can determine if an "ownership claim" has been made on the associated website for a particular item and, if not, how the possessor may proceed to make such a claim.

Once an article has been claimed by a particular user, it may not be claimed by any third party. Accordingly, a system must be provided for allowing a person scanning one of the labeled tags or the like to determine if another party has already established an ownership claim to the label or tag. This is illustrated in FIG. 6, a flowchart illustrating the process of determining if an "ownership claim" has been made for data from a particular product and if not, how to make a claim.

As set forth in block 60, the process is initiated by a user scanning a digital code formed in accordance with the present invention. The website will then transmit to the scanning party an indication of whether the tagged item does have a claimed owner, as indicated in block 62. If it does have an owner, this item cannot be claimed again, as indicated in block 64. If the communication tag is of the type that connects the scanning device to a particular website, that website indication will be displayed on the device as indicated in block 68.

If the scan of the device indicates that the item does not have a claimed owner, the user is alerted that the scanned tag can be claimed in block 70. If the user desires to claim an unclaimed tag, the user uses the scanning device to send a signal to the tag to start the claim process as indicated in block 72. That creates a relationship between the scanning party and the unique item as set forth in block 74, and a form indicating the initial information to be collected from the claiming party is displayed as indicated in block 76, allowing the scanning party to input controls for the limits on the use of the scanned item, as indicated in block 78. When the claiming process is finalized as indicated in block 80, the destination URL of the website that the tag communicates with, if any, will be displayed on the scanning device as indicated in block 82. This destination is also displayed if the user decides not to initiate the claim process as set forth in block 68.

This system thus allows the personalization of a device marked with a communication tag and allows the claimant owner to establish a degree of control over the subsequent use of the device by subsequent scanners.

Having thus described my invention, I claim:

1. A system for providing purchasers of products with information relating to the product beyond that imprinted on the product or its packaging, comprising:

marking each product and/or the container for the product with a digital code which may be read by a scanner having a digital display and a GPS, operative to communicate with a website containing such non-label information regarding the product; wherein the digital code stores information identifying the unique product being scanned and the website contains information relating to such product which is displayed on the scanning device; and wherein the website records the geographic location of the article as determined by the GPS each time the article is scanned and provides a list of the sequence of locations of the scanning upon receipt of an enabling signal from an authorized source.

2. The system of claim 1 wherein the possessor of the unique product may transmit communications relative to the product to the website which limit the addition and/or viewing of information relating to the product by third parties.

3. The method of marketing products in containers, comprising:

marking the container with a digital code comprising a code section uniquely identifying the container and digital coding representing the identity of a website on the Internet;

scanning such digital code with an electronic device having a GPS and being capable of using the encoded identity to establish communication with said website on the Internet and transmit to said website the coding identifying the unique container of the product; and maintaining on said website a record of each time the website receives a communication including the unique code identifying a particular product and the location of that product as determined by the GPS in the electronic device.

4. The method of claim 3 wherein the website comprises a server operative to prepare a report listing each time a communication is received identifying a particular container, and the time of receipt of the communication and the geographic location of the container at that time.

5. The method of claim 3 in which the code is a QR code and the scanner is a cell phone.

6. The method of claim 5 wherein said website comprises a server controllable to limit the provision of information to parties identified in transmissions to the website.

7. The method of claim 3 wherein the identity of a web site on the Internet comprises the URL of the website.

8. The method of claim 3 wherein information relating to the uniquely identified container is transmitted to said website and recorded for provision to parties subsequently contacting said website.

9. The method of claim 8 wherein the information relating to the uniquely identified product comprises comments on the contents of the container.

\* \* \* \* \*